(12) United States Patent
Pan et al.

(10) Patent No.: US 11,578,269 B2
(45) Date of Patent: Feb. 14, 2023

(54) LIQUID CRYSTALLINE POLYMER COMPOSITION

(71) Applicant: Ticona LLC, Florence, KY (US)

(72) Inventors: Jiayong Pan, Shanghai (CN); Min Wang, Shanghai (CN); Young Shin Kim, Cincinnati, OH (US)

(73) Assignee: Ticona LLC, Florence, KY (US)

( * ) Notice: Subject to any disclaimer, the term of this patent is extended or adjusted under 35 U.S.C. 154(b) by 226 days.

(21) Appl. No.: 16/763,065

(22) PCT Filed: May 14, 2018

(86) PCT No.: PCT/CN2018/086736
§ 371 (c)(1),
(2) Date: May 11, 2020

(87) PCT Pub. No.: WO2019/109595
PCT Pub. Date: Jun. 13, 2019

(65) Prior Publication Data
US 2020/0347303 A1   Nov. 5, 2020

Related U.S. Application Data

(60) Provisional application No. 62/594,603, filed on Dec. 5, 2017.

(51) Int. Cl.
| | | |
|---|---|---|
| C09K 19/38 | (2006.01) |
| C08K 3/04 | (2006.01) |
| C08K 3/22 | (2006.01) |
| C08K 3/30 | (2006.01) |
| C08K 3/36 | (2006.01) |
| C08K 3/40 | (2006.01) |
| C08K 7/14 | (2006.01) |
| C08L 27/18 | (2006.01) |
| C08L 83/04 | (2006.01) |
| C09K 19/54 | (2006.01) |

(52) U.S. Cl.
CPC ............ *C09K 19/3809* (2013.01); *C08K 3/04* (2013.01); *C08K 3/22* (2013.01); *C08K 3/30* (2013.01); *C08K 3/36* (2013.01); *C08K 3/40* (2013.01); *C08K 7/14* (2013.01); *C08L 27/18* (2013.01); *C08L 83/04* (2013.01); *C09K 19/542* (2013.01); *C08K 2003/2227* (2013.01); *C08K 2003/3045* (2013.01); *C08K 2201/003* (2013.01)

(58) Field of Classification Search
CPC ............................ C08L 83/04; C09K 19/3809
See application file for complete search history.

(56) References Cited

U.S. PATENT DOCUMENTS

| | | | |
|---|---|---|---|
| 5,091,135 A | 2/1992 | Okada et al. | |
| 5,268,414 A | 12/1993 | Nakai et al. | |
| 5,508,374 A | 4/1996 | Lee et al. | |
| 8,349,927 B2 | 1/2013 | Eckel et al. | |
| 9,284,435 B2 | 3/2016 | Kim | |
| 9,988,519 B2 | 6/2018 | Kim | |
| 10,590,273 B2 | 3/2020 | Luo et al. | |
| 2014/0167088 A1* | 6/2014 | Lu ............................ C08K 7/14 524/394 |

FOREIGN PATENT DOCUMENTS

| | | |
|---|---|---|
| CN | 1854184 A | 11/2006 |
| CN | 102352259 A | 2/2012 |
| JP | H 06287421 A | 10/1994 |
| JP | H 0853607 A | 2/1996 |
| JP | 2000239503 A | 9/2000 |
| JP | 2001105443 A | 4/2001 |
| JP | 2003306598 A | 10/2003 |
| JP | 2008231144 A | 10/2008 |
| JP | 2009280710 A | 12/2009 |

OTHER PUBLICATIONS

English Machine Translation CN102352259A obtained http://translationportal.epo.org/emtp/translate/?ACTION=claims-retrieval&COUNTRY=CN&ENGINE=google&FORMAT=docdb&KIND=A&LOCALE=en_EP&NUMBER=102352259&OPS=ops.epo.org/3.2&SRCLANG=zh&TRGLANG=en (Year: 2012).*
International Search Report and Written Opinion for PCT/CN2018/086736 dated Sep. 12, 2018, 9 pages.

* cited by examiner

*Primary Examiner* — Arrie L Reuther
(74) *Attorney, Agent, or Firm* — Dority & Manning, P.A.

(57) ABSTRACT

A polymer composition comprising at least one liquid crystalline polymer and an ultrahigh molecular weight siloxane polymer in an amount from about 0.1 to about 20 parts by weight per 100 parts by weight of the liquid crystalline polymer is provided. The siloxane polymer has a number average molecular weight of about 100,000 grams per mole or more.

30 Claims, No Drawings

LIQUID CRYSTALLINE POLYMER COMPOSITION

RELATED APPLICATIONS

The present application is the national stage entry of International Patent Application No. PCT/CN2018/086736 having a filing date of May 14, 2018, which claims priority to U.S. Provisional Application Ser. No. 62/594,603 having a filing date of Dec. 5, 2017, both of which are incorporated herein in their entirety by reference thereto.

BACKGROUND OF THE INVENTION

Electrical components often contain molded parts that are formed from a liquid crystalline, thermoplastic resin. Recent demands on the electronic industry have dictated a decreased size of such components to achieve the desired performance and space savings. One such component is an electrical connector, which can be external (e.g., used for power or communication) or internal (e.g., used in computer disk drives or servers, link printed wiring boards, wires, cables and other EEE components). Due to the manner in which they are employed, most electrical components are required to meet certain flammability standards that minimize the risk of the dripping and stringing of the part onto a heat source, e.g., an electric heating element or open flame. Unfortunately, the internal lubricants used in many conventional formulations to assist in the molding process can increase the risk of dripping as such materials have a tendency to migrate to the surface of the part. One solution for this problem has been to produce products with a relatively high level of an anti-dripping additive, such as polytetrafluoroethylene (PTFE). While such additives can improve the flammability properties of the composition, they often lead to other problems, such as poor mechanical and thermal properties (e.g., flowability or heat resistance) and sacrificed flowability.

As such, a need currently exists for a polymer composition that can possess good flammability properties, yet also maintain good mechanical and thermal properties and flowability.

SUMMARY OF THE INVENTION

In accordance with one embodiment of the present invention, a polymer composition is disclosed that comprises at least one liquid crystalline polymer and an ultrahigh molecular weight siloxane polymer in an amount from about 0.1 to about 20 parts by weight per 100 parts by weight of the liquid crystalline polymer. The siloxane polymer has a number average molecular weight of about 100,000 grams per mole or more.

Other features and aspects of the present invention are set forth in greater detail below.

DETAILED DESCRIPTION

It is to be understood by one of ordinary skill in the art that the present discussion is a description of exemplary embodiments only, and is not intended as limiting the broader aspects of the present invention.

Generally speaking, the present invention is directed to a polymer composition that contains a liquid crystalline polymer in combination with a siloxane polymer. The siloxane polymer is generally hydrophobic in nature, which allows it to act as an effective lubricant when the composition is molded into a shaped part. For instance, the resulting polymer composition can achieve a low degree of surface friction that minimizes the extent to which a skin layer is peeled off during use of a part containing the composition. For example, the polymer composition may exhibit a dynamic coefficient of friction of about 1.0 or less, in some embodiments about 0.4 or less, in some embodiments about 0.35 or less, and in some embodiments, from about 0.1 to about 0.3, as determined in accordance with VDA 230-206: 2007. Likewise, the wear depth may be about 500 micrometers or less, in some embodiments about 200 micrometers or less, in some embodiments about 100 micrometers or less, and in some embodiments, from about 10 to about 70 micrometers, as determined in accordance with VDA 230-206:2007. The siloxane polymer also has an ultrahigh molecular weight, such as a number average molecular weight of about 100,000 grams per mole or more, in some embodiments about 200,000 grams per mole or more, and in some embodiments, from about 500,000 grams per mole to about 2,000,000 grams per mole. Due to its high molecular weight, the siloxane polymer can exhibit a reduced tendency to migrate or diffuse to the surface of the polymer composition. This can minimize phase separation, thereby improving mechanical properties while still providing the desired degree of lubrication to the composition.

The polymer composition may, for example, exhibit a tensile strength of from about 20 to about 500 MPa, in some embodiments from about 50 to about 400 MPa, and in some embodiments, from about 60 to about 350 MPa; tensile break strain of about 1% or more, in some embodiments from about 1.5% to about 15%, and in some embodiments, from about 2% to about 10%; and/or tensile modulus of from about 5,000 MPa to about 20,000 MPa, in some embodiments from about 7,000 MPa to about 18,000 MPa, and in some embodiments, from about 8,000 MPa to about 12,000 MPa. The tensile properties may be determined in accordance with ISO Test No. 527:2012 (technically equivalent to ASTM D638-14) at 23° C. The composition may also exhibit a flexural strength of from about 40 to about 500 MPa, in some embodiments from about 60 to about 400 MPa, and in some embodiments, from about 80 to about 250 MPa and/or a flexural modulus of from about 5,000 MPa to about 20,000 MPa, in some embodiments from about 7,000 MPa to about 18,000 MPa, and in some embodiments, from about 8,000 MPa to about 15,000 MPa. The flexural properties may be determined in accordance with ISO Test No. 178:2010 (technically equivalent to ASTM D790-10) at 23° C. The composition may also exhibit a Charpy notched impact strength of about 3 kJ/m$^2$ or more, in some embodiments from about 4 to about 50 kJ/m$^2$, and in some embodiments, from about 5 to about 30 kJ/m$^2$, measured at 23° C. according to ISO Test No. 179-1:2010) (technically equivalent to ASTM D256, Method B). Further, the composition may exhibit a deflection temperature under load (DTUL) of about 180° C. or more, and in some embodiments, from about 190° C. to about 300° C., as measured according to ASTM D648-07 (technically equivalent to ISO Test No. 75-2:2013) at a specified load of 0.45 or 1.8 MPa. The Rockwell hardness of the part may also be about 25 or more, some embodiments about 30 or more, and in some embodiments, from about 35 to about 80, as determined in accordance with ASTM D785-08 (Scale M).

The present inventors have also discovered that the polymer composition can remain dimensionally stable when shaped into a part, and thus exhibit a relatively low degree of warpage. The degree of warpage may be characterized by low "flatness values" as determined by the test described in more detail below. More particularly, the polymer composition may exhibit a flatness value of about 2.0 millimeters or less, in some embodiments about 1.5 millimeter or less, in some embodiments about 1.0 millimeters or less, and in some embodiments, from about 0.1 to about 0.9 millimeters. The flatness value of a specimen (e.g., 80 mm×80 mm×1 mm) may be measured using an OGP Smartscope Quest 300 Optical Measurement System. XYZ Measurements may be taken across the specimen starting with X and Y values corresponding to 5, 22.5, 50, 57.5 and 75 mm. Z values may be normalized so that the minimum Z value corresponded to a height of zero. The flatness value may be calculated as the average of the 25 normalized Z values.

In addition to possessing good mechanical properties, the composition may also exhibit good flame resistance, even in the absence of conventional flame retardants. The flame resistance of the composition may, for instance, be determined in accordance the procedure of Underwriter's Laboratory Bulletin 94 entitled "Tests for Flammability of Plastic Materials, UL94". Several ratings can be applied based on the time to extinguish (total flame time) and ability to resist dripping as described in more detail below. According to this procedure, for example, a molded part formed from the composition of the present invention may achieve a V0 rating, which means that the part has a total flame time of 50 seconds or less and a total number of drips of burning particles that ignite cotton of 0, determined at a given part thickness (e.g., 0.25 mm, 0.4 mm, 0.8 mm, or 1.6 mm). For example, when exposed to an open flame, a molded part formed from the composition of the present invention may exhibit a total flame time of about 50 seconds or less, in some embodiments about 45 seconds or less, and in some embodiments, from about 1 to about 40 seconds. Furthermore, the total number of drips of burning particles produced during the UL94 test may be 3 or less, in some embodiments 2 or less, and in some embodiments, 1 or less (e.g., 0). Such testing may be performed after conditioning for 48 hours at 23° C. and 50% relative humidity.

Of course, the composition can also exhibit excellent antistatic behavior, particularly when an antistatic filler is included within the polymer composition as discussed above. Such antistatic behavior can be characterized by a relatively low surface and/or volume resistivity as determined in accordance with IEC 60093. For example, the composition may exhibit a surface resistivity of about $1\times10^{15}$ ohms or less, in some embodiments about $1\times10^{14}$ ohms or less, in some embodiments from about $1\times10^{10}$ ohms to about $9\times10^{13}$ ohms, and in some embodiments, from about $1\times10^{11}$ to about $1\times10^{13}$ ohms. Likewise, the molded part may also exhibit a volume resistivity of about $1\times10^{15}$ ohm-m or less, in some embodiments from about $1\times10^{9}$ ohm-m to about $9\times10^{14}$ ohm-m, and in some embodiments, from about $1\times10^{10}$ to about $5\times10^{14}$ ohm-m. Of course, such antistatic behavior is by no means required. For example, in some embodiments, the composition may exhibit a relatively high surface resistivity, such as about $1\times10^{15}$ ohms or more, in some embodiments about $1\times10^{16}$ ohms or more, in some embodiments from about $1\times10^{17}$ ohms to about $9\times10^{3}$ ohms, and in some embodiments, from about $1\times10^{18}$ to about $1\times10^{26}$ ohms.

Various embodiments of the present invention will now be described in more detail.

I. Polymer Composition

A. Liquid Crystalline Polymer

Liquid crystalline polymers typically constitute from about 20 wt. % to about 80 wt. %, in some embodiments from about 30 wt. % to about 75 wt. %, and in some embodiments, from about 40 wt. % to about 70 wt. % of the polymer composition. Liquid crystalline polymers are generally classified as "thermotropic" to the extent that they can possess a rod-like structure and exhibit a crystalline behavior in their molten state (e.g., thermotropic nematic state). The polymers have a relatively high melting temperature, such as from about 250° C. to about 400° C., in some embodiments from about 280° C. to about 390° C., and in some embodiments, from about 300° C. to about 380° C. Such polymers may be formed from one or more types of repeating units as is known in the art. A liquid crystalline polymer may, for example, contain one or more aromatic ester repeating units, typically in an amount of from about 60 mol. % to about 99.9 mol. %, in some embodiments from about 70 mol. % to about 99.5 mol. %, and in some embodiments, from about 80 mol. % to about 99 mol. % of the polymer. The aromatic ester repeating units may be generally represented by the following Formula (I):

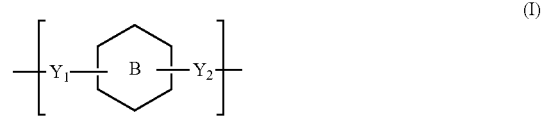

wherein, ring B is a substituted or unsubstituted 6-membered aryl group (e.g., 1,4-phenylene or 1,3-phenylene), a substituted or unsubstituted 6-membered aryl group fused to a substituted or unsubstituted 5- or 6-membered aryl group (e.g., 2,6-naphthalene), or a substituted or unsubstituted 6-membered aryl group linked to a substituted or unsubstituted 5- or 6-membered aryl group (e.g., 4,4-biphenylene); and $Y_1$ and $Y_2$ are independently O, C(O), NH, C(O)HN, or NHC(O).

Typically, at least one of $Y_1$ and $Y_2$ are C(O). Examples of such aromatic ester repeating units may include, for instance, aromatic dicarboxylic repeating units ($Y_1$ and $Y_2$ in Formula I are C(O)), aromatic hydroxycarboxylic repeating units ($Y_1$ is O and $Y_2$ is C(O) in Formula I), as well as various combinations thereof.

Aromatic dicarboxylic repeating units, for instance, may be employed that are derived from aromatic dicarboxylic acids, such as terephthalic acid, isophthalic acid, 2,6-naphthalenedicarboxylic acid, diphenyl ether-4,4'-dicarboxylic acid, 1,6-naphthalenedicarboxylic acid, 2,7-naphthalenedicarboxylic acid, 4,4'-dicarboxybiphenyl, bis(4-carboxyphenyl)ether, bis(4-carboxyphenyl)butane, bis(4-carboxyphenyl)ethane, bis(3-carboxyphenyl)ether, bis(3-carboxyphenyl)ethane, etc., as well as alkyl, alkoxy, aryl and halogen substituents thereof, and combinations thereof. Particularly suitable aromatic dicarboxylic acids may include, for instance, terephthalic acid ("TA"), isophthalic acid ("IA"), and 2,6-naphthalenedicarboxylic acid ("NDA"). When employed, repeating units derived from aromatic dicarboxylic acids (e.g., IA, TA, and/or NDA) typically constitute from about 5 mol. % to about 45 mol. %, in some embodiments from about 10 mol. % to about 40 mol. %, and in some embodiments, from about 10 mol. % to about 35% of the polymer.

Aromatic hydroxycarboxylic repeating units may also be employed that are derived from aromatic hydroxycarboxylic acids, such as, 4-hydroxybenzoic acid; 4-hydroxy-4'-biphenylcarboxylic acid; 2-hydroxy-6-naphthoic acid; 2-hydroxy-5-naphthoic acid; 3-hydroxy-2-naphthoic acid; 2-hydroxy- 3-naphthoic acid; 4'-hydroxyphenyl-4-benzoic acid; 3'-hydroxyphenyl-4-benzoic acid; 4'-hydroxyphenyl-3-benzoic acid, etc., as well as alkyl, alkoxy, aryl and halogen substituents thereof, and combination thereof. Particularly suitable aromatic hydroxycarboxylic acids are 4-hydroxybenzoic acid ("HBA") and 6-hydroxy-2-naphthoic acid ("HNA"). When employed, repeating units derived from hydroxycarboxylic acids (e.g., HBA and/or HNA) typically constitute from about 1 mol. % to about 85 mol. %, in some embodiments from about 2 mol. % to about 80 mol. %, and in some embodiments, from about 10 mol. % to about 75% of the polymer.

Other repeating units may also be employed in the polymer. In certain embodiments, for instance, repeating units may be employed that are derived from aromatic diols, such as hydroquinone, resorcinol, 2,6-dihydroxynaphthalene, 2,7-dihydroxynaphthalene, 1,6-dihydroxynaphthalene, 4,4'-dihydroxybiphenyl (or 4,4'-biphenol), 3,3'-dihydroxybiphenyl, 3,4'-dihydroxybiphenyl, 4,4'-dihydroxybiphenyl ether, bis(4-hydroxyphenyl)ethane, etc., as well as alkyl, alkoxy, aryl and halogen substituents thereof, and combinations thereof. Particularly suitable aromatic diols may include, for instance, hydroquinone ("HQ") and 4,4'-biphenol ("BP"). When employed, repeating units derived from aromatic diols (e.g., HQ and/or BP) typically constitute from about 5 mol. % to about 45 mol. %, in some embodiments from about 10 mol. % to about 40 mol. %, and in some embodiments, from about 10 mol. % to about 35% of the polymer. Repeating units may also be employed, such as those derived from aromatic amides (e.g., acetaminophen ("APAP")) and/or aromatic amines (e.g., 4-aminophenol ("AP"), 3-aminophenol, 1,4-phenylenediamine, 1,3-phenylenediamine, etc.). When employed, repeating units derived from aromatic amides (e.g., APAP) and/or aromatic amines (e.g., AP) typically constitute from about 0.1 mol. % to about 20 mol. %, in some embodiments from about 0.5 mol. % to about 15 mol. %, and in some embodiments, from about 1 mol. % to about 10% of the polymer. It should also be understood that various other monomeric repeating units may be incorporated into the polymer. For instance, in certain embodiments, the polymer may contain one or more repeating units derived from non-aromatic monomers, such as aliphatic or cycloaliphatic hydroxycarboxylic acids, dicarboxylic acids, diols, amides, amines, etc. Of course, in other embodiments, the polymer may be "wholly aromatic" in that it lacks repeating units derived from non-aromatic (e.g., aliphatic or cycloaliphatic) monomers.

Although not necessarily required, the liquid crystalline polymer may be a "low naphthenic" polymer to the extent that it contains a minimal content of repeating units derived from naphthenic hydroxycarboxylic acids and naphthenic dicarboxylic acids, such as naphthalene-2,6-dicarboxylic acid ("NDA"), 6-hydroxy-2-naphthoic acid ("HNA"), or combinations thereof. That is, the total amount of repeating units derived from naphthenic hydroxycarboxylic and/or dicarboxylic acids (e.g., NDA, HNA, or a combination of HNA and NDA) is typically no more than 30 mol. %, in some embodiments no more than about 15 mol. %, in some embodiments no more than about 10 mol. %, in some embodiments no more than about 8 mol. %, and in some embodiments, from 0 mol. % to about 5 mol. % of the polymer (e.g., 0 mol. %). Despite the absence of a high level of conventional naphthenic acids, it is believed that the resulting "low naphthenic" polymers are still capable of exhibiting good thermal and mechanical properties.

In one particular embodiment, the liquid crystalline polymer may be formed from repeating units derived from 4-hydroxybenzoic acid ("HBA") and terephthalic acid ("TA") and/or isophthalic acid ("IA"), as well as various other optional constituents. The repeating units derived from 4-hydroxybenzoic acid ("HBA") may constitute from about 1 mol. % to about 80 mol. %, in some embodiments from about 2 mol. % to about 75 mol. %, and in some embodiments, from about 10 mol. % to about 70% of the polymer. The repeating units derived from terephthalic acid ("TA") and/or isophthalic acid ("IA") may likewise constitute from about 5 mol. % to about 45 mol. %, in some embodiments from about 10 mol. % to about 40 mol. %, and in some embodiments, from about 10 mol. % to about 35% of the polymer. Repeating units may also be employed that are derived from 4,4'-biphenol ("BP") and/or hydroquinone ("HQ") in an amount from about 5 mol. % to about 45 mol. %, in some embodiments from about 10 mol. % to about 40 mol. %, and in some embodiments, from about 10 mol. % to about 35% of the polymer. Other possible repeating units may include those derived from 6-hydroxy-2-naphthoic acid ("HNA"), 2,6-naphthalenedicarboxylic acid ("NDA"), and/or acetaminophen ("APAP"). In certain embodiments, for example, repeating units derived from HNA, NDA, and/or APAP may each constitute from about 1 mol. % to about 55 mol. %, in some embodiments from about 2 mol. % to about 50 mol. %, and in some embodiments, from about 3 mol. % to about 35 mol. % when employed.

B. Ultrahigh Molecular Weight Siloxane Polymer

Ultrahigh molecular weight siloxane polymers typically constitute from about 0.1 to about 20 parts, in some embodiments from about 0.5 to about 10 parts, and in some embodiments, from about 1 to about 5 parts per 100 parts of liquid crystalline polymer(s) employed in the composition. For example, such polymers may constitute from about 0.1 wt. % to about 8 wt. %, in some embodiments from about 0.5 wt. % to about 6 wt. %, and in some embodiments, from about 1 wt. % to about 5 wt. % of the composition. The siloxane polymer may typically has a relative high kinematic viscosity, such as about 10,000 centistokes or more, in some embodiments about 30,000 centistokes or more, and in some embodiments, from about 50,000 to about 500,000 centistokes.

Any of a variety of siloxane polymers may generally be employed in the polymer composition. The siloxane polymer may, for instance, encompass any polymer, co-polymer or oligomer that includes siloxane units in the backbone having the formula:

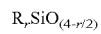

$$R_rSiO_{(4-r/2)}$$

wherein

R is independently hydrogen or substituted or unsubstituted hydrocarbon radicals, and r is 0, 1, 2 or 3.

Some examples of suitable radicals R include, for instance, alkyl, aryl, alkylaryl, alkenyl or alkynyl, or cycloalkyl groups, optionally substituted, and which may be interrupted by heteroatoms, i.e., may contain heteroatom(s) in the carbon chains or rings. Suitable alkyl radicals, may include, for instance, methyl, ethyl, n-propyl, isopropyl, n-butyl, isobutyl, tert-butyl, n-pentyl, isopentyl, neopentyl and tert-pentyl radicals, hexyl radicals (e.g., n-hexyl), heptyl radicals (e.g., n-heptyl), octyl radicals (e.g., n-octyl), isooctyl radicals (e.g., 2,2,4-trimethylpentyl radical), nonyl radicals (e.g., n-nonyl), decyl radicals (e.g., n-decyl), dodecyl radicals (e.g., n-dodecyl), octadecyl radicals (e.g., n-octadecyl), and so forth. Likewise, suitable cycloalkyl radicals may include cyclopentyl, cyclohexyl cycloheptyl radicals, methylcyclohexyl radicals, and so forth; suitable aryl radicals may include phenyl, biphenyl, naphthyl, anthryl, and phenanthryl radicals; suitable alkylaryl radicals may include o-, m- or p-tolyl radicals, xylyl radicals, ethylphenyl radicals, and so forth; and suitable alkenyl or alkynyl radicals may include vinyl, 1-propenyl, 1-butenyl, 1-pentenyl, 5-hexenyl, butadienyl, hexadienyl, cyclopentenyl, cyclopentadienyl, cyclohexenyl, ethynyl, propargyl 1-propynyl, and so forth. Examples of substituted hydrocarbon radicals are halogenated alkyl radicals (e.g., 3-chloropropyl, 3,3,3-trifluoropropyl, and perfluorohexylethyl) and halogenated aryl radicals (e.g., p-chlorophenyl and p-chlorobenzyl). In one particular embodiment, the siloxane polymer includes alkyl radicals (e.g., methyl radicals) bonded to at least 70 mol % of the Si atoms and optionally vinyl and/or phenyl radicals bonded to from 0.001 to 30 mol % of the Si atoms. The siloxane polymer is also preferably composed predominantly of diorganosiloxane units. The end groups of the polyorganosiloxanes may be trialkylsiloxy groups, in particular the trimethylsiloxy radical or the dimethylvinylsiloxy radical. However, it is also possible for one or more of these alkyl groups to have been replaced by hydroxy groups or alkoxy groups, such as methoxy or ethoxy radicals. Particularly suitable examples of the siloxane polymer include, for instance, dimethylpolysiloxane, phenylmethylpolysiloxane, vinylmethylpolysiloxane, and trifluoropropylpolysiloxane.

The siloxane polymer may also include a reactive functionality on at least a portion of the siloxane monomer units of the polymer, such as one or more of vinyl groups, hydroxyl groups, hydrides, isocyanate groups, epoxy groups, acid groups, halogen atoms, alkoxy groups (e.g., methoxy, ethoxy and propoxy), acyloxy groups (e.g., acetoxy and octanoyloxy), ketoximate groups (e.g., dimethylketoxime, methylketoxime and methylethylketoxime), amino groups (e.g., dimethylamino, diethylamino and butylamino), amido groups (e.g., N-methylacetamide and N-ethylacetamide), acid amido groups, amino-oxy groups, mercapto groups, alkenyloxy groups (e.g., vinyloxy, isopropenyloxy, and 1-ethyl-2-methylvinyloxy), alkoxyalkoxy groups (e.g., methoxyethoxy, ethoxyethoxy and methoxypropoxy), aminoxy groups (e.g., dimethylaminoxy and diethylaminoxy), mercapto groups, etc.

If desired, silica particles (e.g., fumed silica) may also be employed in combination with the siloxane polymer to help improve its ability to be dispersed within the composition. Such silica particles may, for instance, have a particle size of from about 5 nanometers to about 50 nanometers, a surface area of from about 50 square meters per gram ($m^2/g$) to about 600 $m^2/g$, and/or a density of from about 160 kilogram per cubic meter ($kg/m^3$) to about 190 $kg/m^3$. When employed, the silica particles typically constitute from about 1 to about 100 parts, and in some some embodiments, from about 20 to about 60 parts by weight based on 100 parts by weight of the siloxane polymer. In one embodiment, the silica particles can be combined with the siloxane polymer prior to addition of this mixture to the polymer composition. For instance a mixture including an ultrahigh molecular weight polydimethylsiloxane and fumed silica can be incorporated in the polymer composition. Such a pre-formed mixture is available as Genioplast® Pellet S from Wacker Chemie, AG.

C. Particulate Filler

If desired, a particulate filler may be employed for improving certain properties of the polymer composition. The particulate filler may be employed in the polymer composition in an amount of from about 10 to about 95 parts, in some embodiments from about 15 to about 90 parts, and in some embodiments, from about 20 to about 85 parts by weight per 100 parts of the liquid crystalline polymer(s) employed in the polymer composition. For instance, the particulate filler may constitute from about 5 wt. % to about 70 wt. %, in some embodiments from about 10 wt. % to about 60 wt. %, and in some embodiments, from about 12 wt. % to about 50 wt. % of the polymer composition.

In certain embodiments, particles may be employed that have a certain hardness value to help improve the surface properties of the composition. For instance, the hardness values may be about 2 or more, in some embodiments about 2.5 or more, in some embodiments from about 3 to about 11, in some embodiments from about 3.5 to about 11, and in some embodiments, from about 4.5 to about 6.5 based on the Mohs hardness scale. Examples of such particles may include, for instance, mica (e.g., Mohs hardness of about 3); carbonates, such as calcium carbonate ($CaCO_3$, Mohs hardness of 3.0) or a copper carbonate hydroxide ($Cu_2CO_3(OH)_2$, Mohs hardness of 4.0); fluorides, such as calcium fluoride ($CaFl_2$, Mohs hardness of 4.0); phosphates, such as calcium pyrophosphate (($Ca_2P_2O_7$, Mohs hardness of 5.0), anhydrous dicalcium phosphate ($CaHPO_4$, Mohs hardness of 3.5), or hydrated aluminum phosphate ($AlPO_4.2H_2O$, Mohs hardness of 4.5); borates, such as calcium borosilicate hydroxide ($Ca_2B_5SiO_9(OH)_5$, Mohs hardness of 3.5); alumina ($AlO_2$, Mohs hardness of 10.0); sulfates, such as calcium sulfate ($CaSO_4$, Mohs hardness of 3.5) or barium sulfate ($BaSO_4$, Mohs hardness of from 3 to 3.5); and so forth, as well as combinations thereof.

The shape of the particles may vary as desired. For instance, flake-shaped particles may be employed in certain embodiments that have a relatively high aspect ratio (e.g., average diameter divided by average thickness), such as about 3:1 or more, in some embodiments about 10:1 or more, in some embodiments about 20:1 or more, and in some embodiments, from about 40:1 to about 200:1. The average diameter of the particles may, for example, range from about 5 micrometers to about 200 micrometers, in some embodiments from about 30 micrometers to about 150 micrometers, and in some embodiments, from about 50 micrometers to about 120 micrometers, such as determined using laser diffraction techniques in accordance with ISO 13320:2009 (e.g., with a Horiba LA-960 particle size distribution analyzer). Suitable flaked-shaped particles may be formed from a natural and/or synthetic silicate mineral, such as mica, halloysite, kaolinite, illite, montmorillonite, vermiculite, palygorskite, pyrophyllite, calcium silicate, aluminum silicate, wollastonite, etc. Mica, for instance, is particularly suitable. Any form of mica may generally be employed, including, for instance, muscovite ($KAl_2(AlSi_3)O_{10}(OH)_2$), biotite ($K(Mg,Fe)_3(AlSi_3)O_{10}(OH)_2$), phlogopite ($KMg_3(AlSi_3)O_{10}(OH)_2$), lepidolite ($K(Li,Al)_{2-3}(AlSi_3)O_{10}(OH)_2$), glauconite ($(K,Na)(Al,Mg,Fe)_2(Si,Al)_4O_{10}(OH)_2$), etc. Granular particles may also be employed. Typically, such particles have an average diameter of from about 0.1 to about 10 micrometers, in some embodiments from about 0.2 to about 4 micrometers, and in some embodiments, from about 0.5 to about 2 micrometers, such as determined using laser diffraction techniques in accordance with ISO 13320:2009 (e.g., with a Horiba LA-960 particle size distribution analyzer). Particularly suitable granular fillers may include, for instance, talc, barium sulfate, calcium sulfate, calcium carbonate, etc.

The particulate filler may be formed primarily or entirely from one type of particle, such as flake-shaped particles (e.g., mica) or granular particles (e.g., barium sulfate). That is, such flaked-shaped or granular particles may constitute about 50 wt. % or more, and in some embodiments, about 75 wt. % or more (e.g., 100 wt. %) of the particulate filler. Of course, in other embodiments, flake-shaped and granular particles may also be employed in combination. In such embodiments, for example, flake-shaped particles may constitute from about 0.5 wt. % to about 20 wt. %, and in some embodiments, from about 1 wt. % to about 10 wt. % of the particulate filler, while the granular particles constitute from about 80 wt. % to about 99.5 wt. %, and in some embodiments, from about 90 wt. % to about 99 wt. % of the particulate filler.

If desired, the particles may also be coated with a fluorinated additive to help improve the processing of the composition, such as by providing better mold filling, internal lubrication, mold release, etc. The fluorinated additive may include a fluoropolymer, which contains a hydrocarbon backbone polymer in which some or all of the hydrogen atoms are substituted with fluorine atoms. The backbone polymer may polyolefinic and formed from fluorine-substituted, unsaturated olefin monomers. The fluoropolymer can be a homopolymer of such fluorine-substituted monomers or a copolymer of fluorine-substituted monomers or mixtures of fluorine-substituted monomers and non-fluorine-substituted monomers. Along with fluorine atoms, the fluoropolymer can also be substituted with other halogen atoms, such as chlorine and bromine atoms. Representative monomers suitable for forming fluoropolymers for use in this invention are tetrafluoroethylene, vinylidene fluoride, hexafluoropropylene, chlorotrifluoroethylene, perfluoroethylvinyl ether, perfluoromethylvinyl ether, perfluoropropylvinyl ether, etc., as well as mixtures thereof. Specific examples of suitable fluoropolymers include polytetrafluoroethylene, perfluoroalkylvinyl ether, poly(tetrafluoroethylene-co-perfluoroalkyvinylether), fluorinated ethylene-propylene copolymer, ethylene-tetrafluoroethylene copolymer, polyvinylidene fluoride, polychlorotrifluoroethylene, etc., as well as mixtures thereof.

D. Reinforcing Fibers

Any of a variety of different types of reinforcing fibers may generally be employed in the polymer composition of the present invention, such as polymer fibers, metal fibers, carbonaceous fibers (e.g., graphite, carbide, etc.), inorganic fibers, etc., as well as combinations thereof. Inorganic fibers may be particularly suitable, such as those that are derived from glass; titanates (e.g., potassium titanate); silicates, such as neosilicates, sorosilicates, inosilicates (e.g., calcium inosilicates, such as wollastonite; calcium magnesium inosilicates, such as tremolite; calcium magnesium iron inosilicates, such as actinolite; magnesium iron inosilicates, such as anthophyllite; etc.), phyllosilicates (e.g., aluminum phyllosilicates, such as palygorskite), tectosilicates, etc.; sulfates, such as calcium sulfates (e.g., dehydrated or anhydrous gypsum); mineral wools (e.g., rock or slag wool); and so forth. Glass fibers may be particularly suitable for use in the present invention, such as those formed from E-glass, A-glass, C-glass, D-glass, AR-glass, R-glass, S1-glass, S2-glass, etc., as well as mixtures thereof. If desired, the reinforcing fibers may be provided with a sizing agent or other coating as is known in the art. Regardless of the particular type selected, the fibers may have a relatively low elastic modulus to enhance the processability of the resulting polymer composition. The fibers may, for instance, have a Young's modulus of elasticity of less than about 76 GPa, in some embodiments less than about 75 GPa, and in some embodiments, from about 10 to about 74 GPa, as determined in accordance with ASTM C1557-14.

The cross-sectional area of the fibers may vary as desired. In some embodiments, for example, the fibers may be generally symmetrical in nature (e.g., square, circular, etc.) such that the aspect ratio of from about 0.8 to about 10, in some embodiments from about 2 to about 8, and in some embodiments, from about 3 to about 5. The aspect ratio is determined by dividing the cross-sectional width of the fibers (i.e., in the direction of the major axis) by the cross-sectional thickness of the fibers (i.e., in the direction of the minor axis). In other embodiments, however, it may be desirable to use fibers that have a relatively flat cross-sectional dimension in that they have an aspect ratio of from about 1.5 to about 10, in some embodiments from about 2 to about 8, and in some embodiments, from about 3 to about 5. The shape of such fibers may be in the form of an ellipse, rectangle, rectangle with one or more rounded corners, etc. Regardless of the particular shape, the cross-sectional width of the fibers may be from about 1 to about 50 micrometers, in some embodiments from about 5 to about 45 micrometers, and in some embodiments, from about 10 to about 35 micrometers. The fibers may also have a thickness of from about 0.5 to about 30 micrometers, in some embodiments from about 1 to about 20 micrometers, and in some embodiments, from about 3 to about 15 micrometers. It should be understood that the cross-sectional thickness and/or width need not be uniform over the entire cross-section. In such circumstances, the cross-sectional width is considered as the largest dimension along the major axis of the fiber and the cross-sectional thickness is considered as the largest dimension along the minor axis. For example, the cross-sectional thickness for an elliptical fiber is the minor diameter of the ellipse.

The reinforcing fibers may also have a narrow size distribution. That is, at least about 60% by volume of the fibers, in some embodiments at least about 70% by volume of the fibers, and in some embodiments, at least about 80% by volume of the fibers may have a width and/or thickness within the ranges noted above. The fibers may be endless or chopped fibers, such as those having a length of from about 1 to about 15 millimeters, and in some embodiments, from about 2 to about 6 millimeters. In other embodiments, milled fibers may be employed, such as those having a length of from about 10 to about 500 micrometers, and in some embodiments, from about 50 to about 300 micrometers. The dimension of the fibers (e.g., length, width, and thickness) may be determined using known optical microscopy techniques.

When employed, the amount of reinforcing fibers may be selectively controlled to achieve the desired combination of flow and good mechanical properties. The reinforcing fibers may, for example, be employed in an amount of from about 10 to about 80 parts, in some embodiments from about 20 to about 70 parts, and in some embodiments, from about 30 to about 60 parts per 100 parts by weight of liquid crystalline polymer(s) employed in the polymer composition. The reinforcing fibers may, for instance, constitute from about 5 wt. % to about 60 wt. %, in some embodiments from about 10 wt. % to about 50 wt. %, and in some embodiments, from about 15 wt. % to about 40 wt. % of the polymer composition.

E. Flow Modifier

The composition may be formed by melt processing the liquid crystalline polymer and/or siloxane polymer in the presence of a flow modifier that helps achieve a low melt viscosity without sacrificing other properties of the composition. Such flow modifiers are typically present in an amount of from about 0.05 to about 5 parts, in some embodiments from about 0.1 to about 1 part, and in some embodiments, from about 0.2 to about 1 part by weight relative to 100 parts by weight of the liquid crystalline polymer(s). For example, the flow modifier may constitute from about 0.01 wt. % to about 5 wt. %, in some embodiments from about 0.05 wt. % to about 3 wt. %, and in some embodiments, from about 0.1 wt. % to about 1 wt. % of the polymer composition.

The flow modifier is typically a compound that contains one or more functional groups (e.g., hydroxyl, carboxyl, etc.). The term "functional" generally means that the compound contains at least one functional group (e.g., carboxyl, hydroxyl, etc.) or is capable of possessing such a functional group in the presence of a solvent. The functional compounds used herein may be mono-, di-, tri-functional, etc. The total molecular weight of the compound is relatively low so that it so that it can effectively serve as a flow modifier for the polymer composition. The compound typically has a molecular weight of from about 2,000 grams per mole or less, in some embodiments from about 25 to about 1,000 grams per mole, in some embodiments from about 50 to about 500 grams per mole, and in some embodiments, from about 100 to about 400 grams per mole.

Any of a variety of functional compounds may generally be employed. In certain embodiments, a metal hydroxide compound may be employed that has the general formula $M(OH)_s$, where s is the oxidation state (typically from 1 to 3) and M is a metal, such as a transitional metal, alkali metal, alkaline earth metal, or main group metal. Without intending to be limited by theory, it is believed that such compounds can effectively "lose" water under the process conditions (e.g., high temperature), which can assist in melt viscosity reduction. Examples of suitable metal hydroxides may include copper (II) hydroxide ($Cu(OH)_2$), potassium hydroxide (KOH), sodium hydroxide (NaOH), magnesium hydroxide ($Mg(OH)_2$), calcium hydroxide ($Ca(OH)_2$), aluminum hydroxide ($Al(OH)_3$), and so forth. Also suitable are metal alkoxide compounds that are capable of forming a hydroxyl functional group in the presence of a solvent, such as water. Such compounds may have the general formula $M(OR)_s$, wherein s is the oxidation state (typically from 1 to 3), M is a metal, and R is alkyl. Examples of such metal alkoxides may include copper (II) ethoxide ($Cu^{2+}(CH_3CH_2O^-)_2$), potassium ethoxide ($K^+(CH_3CH_2O^-)$), sodium ethoxide ($Na^+(CH_3CH_2O^-)$), magnesium ethoxide ($Mg^{2+}(CH_3CH_2O^-)_2$), calcium ethoxide ($Ca^{2+}(CH_3CH_2O^-)_2$), etc.; aluminum ethoxide ($Al^{3+}(CH_3CH_2O^-)_3$), and so forth. Besides metal hydroxides, metal salt hydrates may also employed, which are typically represented by the formula $MA*xH_2O$, wherein M is a metal cation, A is an anion, and x is from 1 to 20, and in some embodiments, from 2 to 10. Specific examples of such hydrates may include, for instance, $CaCl_2 \cdot H_2O$, $ZnCl_2 \cdot 4H_2O$, $CoCl_2 \cdot 6H_2O$, $CaSO_4 \cdot 2H_2O$, $MgSO_4 \cdot 7H_2O$, $CuSO_4 \cdot 5H_2O$, $Na_2SO_4 \cdot 10H_2O$, $Na_2CO_3 \cdot 10H_2O$, $Na_2B_4O_7 \cdot 10H_2O$ and $Ba(OH)_2 \cdot 8H_2O$.

F. Impact Modifier

If desired, an impact modifier may also be employed in the polymer composition to help improve the impact strength and flexibility of the polymer composition. In fact, the impact modifier can actually make the surface of a molded part smoother and minimize the likelihood that a skin layer is peeled therefrom during use. When employed, the impact modifier typically constitutes from about 0.1 to about 20 parts, in some embodiments from about 0.2 to about 10 parts, and in some embodiments, from about 0.5 to about 5 parts by weight per 100 parts of the liquid crystalline polymer(s) employed in the polymer composition. For instance, the impact modifier may constitute from about 0.1 wt. % to about 10 wt. %, in some embodiments from about 0.2 wt. % to about 8 wt. %, and in some embodiments, from about 0.5 wt. % to about 4 wt. % of the polymer composition.

One particularly suitable type of impact modifier may include, for instance, an olefin copolymer that is "epoxy-functionalized" in that it contains, on average, two or more epoxy functional groups per molecule. The copolymer generally contains an olefinic monomeric unit that is derived from one or more α-olefins. Examples of such monomers include, for instance, linear and/or branched α-olefins having from 2 to 20 carbon atoms and typically from 2 to 8 carbon atoms. Specific examples include ethylene, propylene, 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents: 1-nonene with one or more methyl, ethyl or propyl substituents; ethyl, methyl or dimethyl-substituted 1-decene; 1-dodecene; and styrene. Particularly desired α-olefin monomers are ethylene and propylene. The copolymer may also contain an epoxy-functional monomeric unit. One example of such a unit is an epoxy-functional (meth)acrylic monomeric component. As used herein, the term "(meth)acrylic" includes acrylic and methacrylic monomers, as well as salts or esters thereof, such as acrylate and methacrylate monomers. For example, suitable epoxy-functional (meth)acrylic monomers may include, but are not limited to, those containing 1,2-epoxy groups, such as glycidyl acrylate and glycidyl methacrylate. Other suitable epoxy-functional monomers include allyl glycidyl ether, glycidyl ethacrylate, and glycidyl itoconate. Other suitable monomers may also be employed to help achieve the desired molecular weight.

Of course, the copolymer may also contain other monomeric units as is known in the art. For example, another suitable monomer may include a (meth)acrylic monomer that is not epoxy-functional. Examples of such (meth)acrylic monomers may include methyl acrylate, ethyl acrylate, n-propyl acrylate, i-propyl acrylate, n-butyl acrylate, s-butyl acrylate, i-butyl acrylate, t-butyl acrylate, n-amyl acrylate, i-amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, 2-hydroxyethyl methacrylate, n-propyl methacrylate, n-butyl methacrylate, i-propyl methacrylate, i-butyl methacrylate, n-amyl methacrylate, n-hexyl methacrylate, i-amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, isobornyl methacrylate, etc., as well as combinations thereof. In one particular embodiment, for example, the copolymer may be a terpolymer formed from an epoxy-functional (meth)acrylic monomeric component, α-olefin monomeric component, and non-epoxy functional (meth)acrylic monomeric component. The copolymer may, for instance, be poly(ethylene-co-butylacrylate-co-glycidyl methacrylate), which has the following structure:

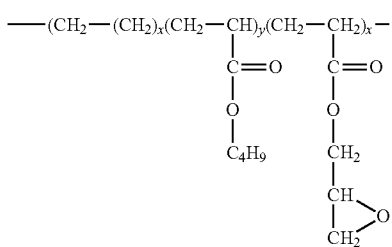

wherein, x, y, and z are 1 or greater.

The relative portion of the monomeric component(s) may be selected to achieve a balance between epoxy-reactivity and melt flow rate. More particularly, high epoxy monomer contents can result in good reactivity with the matrix polymer, but too high of a content may reduce the melt flow rate to such an extent that the copolymer adversely impacts the melt strength of the polymer blend. Thus, in most embodiments, the epoxy-functional (meth)acrylic monomer(s) constitute from about 1 wt. % to about 20 wt. %, in some embodiments from about 2 wt. % to about 15 wt. %, and in some embodiments, from about 3 wt. % to about 10 wt. % of the copolymer. The α-olefin monomer(s) may likewise constitute from about 55 wt. % to about 95 wt. %, in some embodiments from about 60 wt. % to about 90 wt. %, and in some embodiments, from about 65 wt. % to about 85 wt. % of the copolymer. When employed, other monomeric components (e.g., non-epoxy functional (meth)acrylic monomers) may constitute from about 5 wt. % to about 35 wt. %, in some embodiments from about 8 wt. % to about 30 wt. %, and in some embodiments, from about 10 wt. % to about 25 wt. % of the copolymer. The result melt flow rate is typically from about 1 to about 30 grams per 10 minutes ("g/10 min"), in some embodiments from about 2 to about 20 g/10 min, and in some embodiments, from about 3 to about 15 g/10 min, as determined in accordance with ASTM D1238-13 at a load of 2.16 kg and temperature of 190° C.

One example of a suitable epoxy-functionalized copolymer that may be used in the present invention is commercially available from Arkema under the name LOTADER® AX8840. LOTADER® AX8840, for instance, has a melt flow rate of 5 g/10 min and has a glycidyl methacrylate monomer content of 8 wt. %. Another suitable copolymer is commercially available from DuPont under the name ELVALOY® PTW, which is a terpolymer of ethylene, butyl acrylate, and glycidyl methacrylate and has a melt flow rate of 12 g/10 min and a glycidyl methacrylate monomer content of 4 wt. % to 5 wt. %.

G. Antistatic Filler

An antistatic filler may also be employed in the polymer composition to help reduce the tendency to create a static electric charge during a molding operation, transportation, collection, assembly, etc. Such fillers, when employed, typically constitute from about 0.1 to about 20 parts, in some embodiments from about 0.2 to about 10 parts, and in some embodiments, from about 0.5 to about 5 parts by weight per 100 parts of the liquid crystalline polymer(s) employed in the polymer composition. For instance, the antistatic filler may constitute from about 0.1 wt. % to about 10 wt. %, in some embodiments from about 0.2 wt. % to about 5 wt. %, and in some embodiments from about 0.4 wt. % to about 3 wt. % of the polymer composition.

Any of a variety of antistatic fillers may generally be employed in the polymer composition to help improve its antistatic characteristics. Examples of suitable antistatic fillers may include, for instance, metal particles (e.g., aluminum flakes), metal fibers, carbon particles (e.g., graphite, expanded graphite, grapheme, carbon black, graphitized carbon black, etc.), carbon nanotubes, carbon fibers, and so forth. Carbon fibers and carbon particles (e.g., graphite) are particularly suitable. When employed, suitable carbon fibers may include pitch-based carbon (e.g., tar pitch), polyacrylonitrile-based carbon, metal-coated carbon, etc. Desirably, the carbon fibers have a high purity in that they possess a relatively high carbon content, such as a carbon content of about 85 wt. % or more, in some embodiments about 90 wt. % or more, and in some embodiments, about 93 wt. % or more. For instance, the carbon content can be at least about 94% wt., such as at least about 95% wt., such as at least about 96% wt., such at least about 97% wt., such as even at least about 98% wt. The carbon purity is generally less than 100 wt. %, such as less than about 99 wt. %. The density of the carbon fibers is typically from about 0.5 to about 3.0 g/cm$^3$, in some embodiments from about 1.0 to about 2.5 g/cm$^3$, and in some embodiments, from about 1.5 to about 2.0 g/cm$^3$.

In one embodiment, the carbon fibers are incorporated into the matrix with minimal fiber breakage. The volume average length of the fibers after molding can generally be from about 0.1 mm to about 1 mm even when using a fiber having an initial length of about 3 mm. The average length and distribution of the carbon fibers can also be selectively controlled in the final polymer composition to achieve a better connection and electrical pathway within the liquid crystalline polymer matrix. The average diameter of the fibers can be from about 0.5 to about 30 micrometers, in some embodiments from about 1 to about 20 micrometers, and in some embodiments, from about 3 to about 15 micrometers.

To improve dispersion within the polymer matrix, the carbon fibers may be at least partially coated with a sizing agent that increases the compatibility of the carbon fibers with the liquid crystalline polymer. The sizing agent may be stable so that it does not thermally degrade at temperatures at which the liquid crystalline polymer is molded. In one embodiment, the sizing agent may include a polymer, such as an aromatic polymer. For instance, the aromatic polymer may have a thermal decomposition temperature of greater than about 300° C., such as greater than about 350° C., such as greater than about 400° C. As used herein, the thermal decomposition temperature of a material is the temperature at which the material losses 5% of its mass during thermogravimeteric analysis as determined in accordance with ASTM Test E 1131 (or ISO Test 11358). The sizing agent can also have a relatively high glass transition temperature. For instance, the glass transition temperature of the sizing agent can be greater than about 300° C., such as greater than about 350° C., such as greater than about 400° C. Particular examples of sizing agents include polyimide polymers, aromatic polyester polymers including wholly aromatic polyester polymers, and high temperature epoxy polymers. In one embodiment, the sizing agent may include a liquid crystalline polymer. The sizing agent can be present on the fibers in an amount of at least about 0.1% wt., such as in an amount of at least 0.2% wt., such as in an amount of at least about 0.1% wt. The sizing agent is generally present in an amount less than about 5% wt., such as in an amount of less than about 3% wt.

Another suitable antistatic filler is an ionic liquid. One benefit of such a material is that, in addition to being an antistatic agent, the ionic liquid can also exist in liquid form during melt processing, which allows it to be more uniformly blended within the polymer matrix. This improves electrical connectivity and thereby enhances the ability of the composition to rapidly dissipate static electric charges from its surface.

The ionic liquid is generally a salt that has a low enough melting temperature so that it can be in the form of a liquid when melt processed with the liquid crystalline polymer. For example, the melting temperature of the ionic liquid may be about 400° C. or less, in some embodiments about 350° C. or less, in some embodiments from about 1° C. to about 100° C., and in some embodiments, from about 5° C. to about 50° C. The salt contains a cationic species and counterion. The cationic species contains a compound having at least one heteroatom (e.g., nitrogen or phosphorous) as a "cationic center." Examples of such heteroatomic compounds include, for instance, quaternary oniums having the following structures:

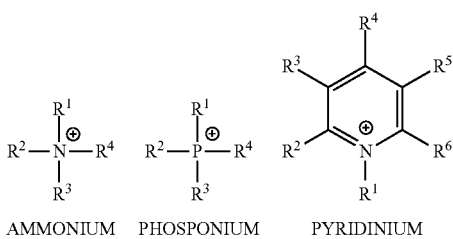

AMMONIUM    PHOSPONIUM    PYRIDINIUM

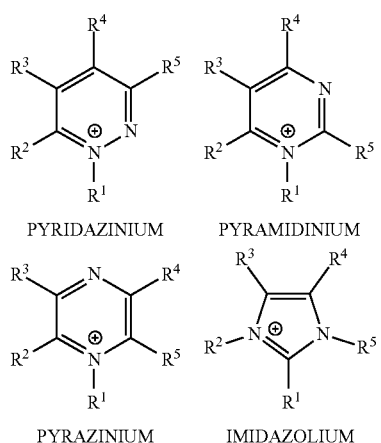

PYRIDAZINIUM    PYRAMIDINIUM

PYRAZINIUM    IMIDAZOLIUM

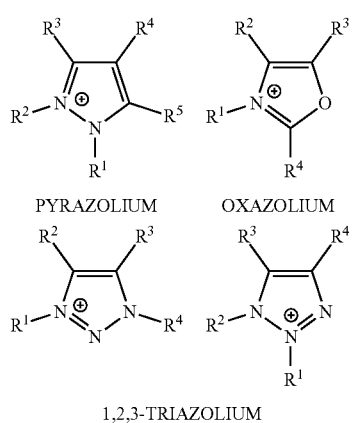

PYRAZOLIUM    OXAZOLIUM 1,2,3-TRIAZOLIUM

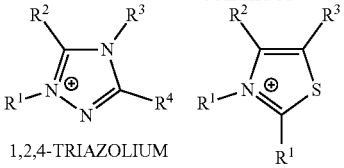

1,2,4-TRIAZOLIUM    TRIAZOLIUM

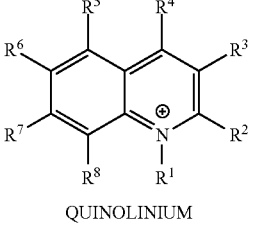

QUINOLINIUM

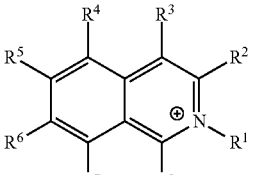

ISOQUINOLINIUM    PIPERDINIUM

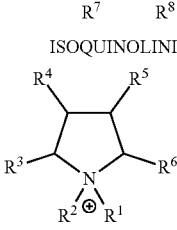

PYRROLIDINIUM wherein, $R^1$, $R^2$, $R^3$, $R^4$, $R^5$, $R^6$, $R^7$, and $R^8$ are independently selected from the group consisting of hydrogen; substituted or unsubstituted $C_1$-$C_{10}$ alkyl groups (e.g., methyl, ethyl, n-propyl, isopropyl, n-butyl, isobutyl, sec-butyl, tert-butyl, n-pentyl, etc.); substituted or unsubstituted $C_3$-$C_{14}$ cycloalkyl groups (e.g., adamantyl, cyclopropyl, cyclobutyl, cyclopentyl, cyclooctyl, cyclohexenyl, etc.); substituted or unsubstituted $C_1$-$C_{10}$ alkenyl groups (e.g., ethylene, propylene, 2-methypropylene, pentylene, etc.); substituted or unsubstituted $C_2$-$C_{10}$ alkynyl groups (e.g., ethynyl, propynyl, etc.); substituted or unsubstituted $C_1$-$C_{10}$ alkoxy groups (e.g., methoxy, ethoxy, n-propoxy, isopropoxy, n-butoxy, t-butoxy, sec-butoxy, n-pentoxy, etc.); substituted or unsubstituted acyloxy groups (e.g., methacryloxy, methacryloxyethyl, etc.); substituted or unsubstituted aryl groups (e.g., phenyl); substituted or unsubstituted heteroaryl groups (e.g., pyridyl, furanyl, thienyl, thiazolyl, isothiazolyl, triazolyl, imidazolyl, isoxazolyl, pyrrolyl, pyrazolyl, pyridazinyl, pyrimidinyl, quinolyl, etc.); and so forth. In one particular embodiment, for example, the cationic species may be an ammonium compound having the structure $N^+R^1R^2R^3R^4$, wherein $R^1$, $R^2$, and/or $R^3$ are independently a $C_1$-$C_6$ alkyl (e.g., methyl, ethyl, butyl, etc.) and $R^4$ is hydrogen or a $C_1$-$C_4$ alkyl group (e.g., methyl or ethyl). For example, the cationic component may be tri-butylmethylammonium, wherein $R^1$, $R^2$, and $R^3$ are butyl and $R^4$ is methyl.

Suitable counterions for the cationic species may include, for example, halogens (e.g., chloride, bromide, iodide, etc.); sulfates or sulfonates (e.g., methyl sulfate, ethyl sulfate, butyl sulfate, hexyl sulfate, octyl sulfate, hydrogen sulfate, methane sulfonate, dodecylbenzene sulfonate, dodecylsulfate, trifluoromethane sulfonate, heptadecafluorooctanesulfonate, sodium dodecylethoxysulfate, etc.); sulfosuccinates; amides (e.g., dicyanamide); imides (e.g., bis(pentafluoroethyl-sulfonyl)imide, bis(trifluoromethylsulfonyl)imide, bis(trifluoromethyl)imide, etc.); borates (e.g., tetrafluoroborate, tetracyanoborate, bis[oxalato]borate, bis[salicylato]borate, etc.); phosphates or phosphinates (e.g., hexafluorophosphate, diethylphosphate, bis(pentafluoroethyl)phosphinate, tris(pentafluoroethyl)-trifluorophosphate, tris(nonafluorobutyl)trifluorophosphate, etc.); antimonates (e.g., hexafluoroantimonate); aluminates (e.g., tetrachloroaluminate); fatty acid carboxylates (e.g., oleate, isostearate, pentadecafluorooctanoate, etc.); cyanates; acetates; and so forth, as well as combinations of any of the foregoing. To help improve compatibility with the liquid crystalline polymer, it may be desired to select a counterion that is generally hydrophobic in nature, such as imides, fatty acid carboxylates, etc. Particularly suitable hydrophobic counterions may include, for instance, bis(pentafluoroethylsulfonyl)imide, bis(trifluoromethylsulfonyl)imide, and bis(trifluoromethyl)imide.

H. Other Additives

A wide variety of additional additives can also be included in the polymer composition, such as lubricants, thermally conductive fillers, pigments, antioxidants, stabilizers, surfactants, waxes, flame retardants, anti-drip additives, and other materials added to enhance properties and processability.

II. Formation

The liquid crystalline polymer, siloxane polymer, and other optional additives may be melt processed or blended together. The components may be supplied separately or in combination to an extruder that includes at least one screw rotatably mounted and received within a barrel (e.g., cylindrical barrel) and may define a feed section and a melting section located downstream from the feed section along the length of the screw. The extruder may be a single screw or twin screw extruder. The speed of the screw may be selected to achieve the desired residence time, shear rate, melt processing temperature, etc. For example, the screw speed may range from about 50 to about 800 revolutions per minute ("rpm"), in some embodiments from about 70 to about 150 rpm, and in some embodiments, from about 80 to about 120 rpm. The apparent shear rate during melt blending may also range from about 100 seconds- to about 10,000 seconds$^{-1}$, in some embodiments from about 500 seconds$^{-1}$ to about 5000 seconds$^{-1}$, and in some embodiments, from about 800 seconds$^{-1}$ to about 1200 seconds$^{-1}$. The apparent shear rate is equal to $4Q/\pi R^3$, where Q is the volumetric flow rate ("m$^3$/s") of the polymer melt and R is the radius ("m") of the capillary (e.g., extruder die) through which the melted polymer flows.

Regardless of the particular manner in which it is formed, the resulting polymer composition can possess excellent thermal properties. For example, the melt viscosity of the polymer composition may be low enough so that it can readily flow into the cavity of a mold having small dimensions. In one particular embodiment, the polymer composition may have a melt viscosity of from about 0.5 to about 200 Pa-s, in some embodiments from about 1 to about 100 Pa-s, in some embodiments from about 2 to about 60 Pa-s, and in some embodiments, from about 3 to about 40 Pa-s, as determined in accordance with ISO Test No. 11443:2005 at a shear rate of 1000 seconds$^{-1}$ and temperature that is 15° C. higher than the melting temperature of the composition (e.g., 350° C.).

III. Shaped Parts

Shaped parts may be formed from the polymer composition having a wide variety of thicknesses, such as about 10 millimeters or less, in some embodiments about 5 millimeters or less, and in some embodiments, from about 1 to about 4 millimeters (e.g., 3 millimeters). The shaped part may be formed using a variety of different techniques. Suitable techniques may include, for instance, injection molding, low-pressure injection molding, extrusion compression molding, gas injection molding, foam injection molding, low-pressure gas injection molding, low-pressure foam injection molding, gas extrusion compression molding, foam extrusion compression molding, extrusion molding, foam extrusion molding, compression molding, foam compression molding, gas compression molding, etc. For example, an injection molding system may be employed that includes a mold within which the polymer composition may be injected. The time inside the injector may be controlled and optimized so that polymer matrix is not pre-solidified. When the cycle time is reached and the barrel is full for discharge, a piston may be used to inject the composition to the mold cavity. Compression molding systems may also be employed. As with injection molding, the shaping of the polymer composition into the desired article also occurs within a mold. The composition may be placed into the compression mold using any known technique, such as by being picked up by an automated robot arm. The temperature of the mold may be maintained at or above the solidification temperature of the polymer matrix for a desired time period to allow for solidification. The molded product may then be solidified by bringing it to a temperature below that of the melting temperature. The resulting product may be de-molded. The cycle time for each molding process may be adjusted to suit the polymer matrix, to achieve sufficient bonding, and to enhance overall process productivity.

A wide variety of types of parts may also be formed from the polymer composition of the present invention. For instance, an electronic component, such as an electrical connector or camera module, may incorporate the part. Examples of products that may contain such electronic components (e.g., connector, camera module, etc.) may include, for instance, cellular telephones, laptop computers, small portable computers (e.g., ultraportable computers, netbook computers, and tablet computers), wrist-watch devices, pendant devices, headphone and earpiece devices, media players with wireless communications capabilities, handheld computers (also sometimes called personal digital assistants), remote controllers, global positioning system (GPS) devices, handheld gaming devices, battery covers, speakers, camera modules, integrated circuits (e.g., SIM cards), housings for electronic devices, electrical controls, circuit breakers, switches, power electronics, printer parts, etc. In one particular embodiment, the polymer composition may be employed in a camera module, such as those commonly employed in wireless communication devices (e.g., cellular telephone). For example, the camera module may employ a base, carrier assembly mounted on the base, a cover mounted on the carrier assembly, etc. The base may have a thickness of about 500 micrometers or less, in some embodiments from about 10 to about 450 micrometers, and in some embodiments, from about 20 to about 400 micrometers. Likewise, the carrier assembly may have a wall thickness of about 500 micrometers or less, in some embodiments from about 10 to about 450 micrometers, and in some embodiments, from about 20 to about 400 micrometers.

The present invention may be better understood with reference to the following examples.

Test Methods

UL94:

A specimen is supported in a vertical position and a flame is applied to the bottom of the specimen. The flame is applied for ten (10) seconds and then removed until flaming stops, at which time the flame is reapplied for another ten (10) seconds and then removed. Two (2) sets of five (5) specimens are tested. The sample size is a length of 125 mm, width of 13 mm, and thickness of 0.4 or 0.8 mm. Each thickness is tested after conditioning for 48 hours at 23° C. and 50% relative humidity.

| Vertical Ratings | Requirements |
|---|---|
| V-0 | Specimens must not burn with flaming combustion for more than 10 seconds after either test flame application. Total flaming combustion time must not exceed 50 seconds for each set of 5 specimens. Specimens must not burn with flaming or glowing combustion up to the specimen holding clamp. Specimens must not drip flaming particles that ignite the cotton. No specimen can have glowing combustion remain for longer than 30 seconds after removal of the test flame. |
| V-1 | Specimens must not burn with flaming combustion for more than 30 seconds after either test flame application. Total flaming combustion time must not exceed 250 seconds for each set of 5 specimens. Specimens must not burn with flaming or glowing combustion up to the specimen holding clamp. Specimens must not drip flaming particles that ignite the cotton. No specimen can have glowing combustion remain for longer than 60 seconds after removal of the test flame. |
| V-2 | Specimens must not burn with flaming combustion for more than 30 seconds after either test flame application. Total flaming combustion time must not exceed 250 seconds for each set of 5 specimens. Specimens must not burn with flaming or glowing combustion up to the specimen holding clamp. Specimens can drip flaming particles that ignite the cotton. No specimen can have glowing combustion remain for longer than 60 seconds after removal of the test flame. |

Friction and Wear:

The degree of friction generated by sample can be characterized by the average dynamic coefficient of friction (dimensionless) as determined according to VDA 230-206:2007 using a SSP-03 machine (Stick Slip test). Likewise, the degree of wear of a sample testing may also be determined in accordance with VDA 230-206:2007. More particularly, ball-shape specimens and plate shape specimens are prepared using a polymer product via injection molding process. The ball specimen is 0.5 inches in diameter. The plate specimen is obtained from middle part of ISO tensile bar by cutting two end areas of the tensile bars. The plate specimen is fixed on sample holder, and the ball specimen is moved in contact with the plate specimens at 150 mm/s and 15 N force. After 1000 cycles, the dynamic coefficient of friction is obtained. The depth of wear is obtained from ball specimens by measuring diameter of worn-out ball area. Based on the diameter of the worn-out area, the depth of worn-out the ball specimen is calculated and obtained.

Melt Viscosity:

The melt viscosity (Pa·s) may be determined in accordance with ISO Test No. 11443:2005 at a shear rate of 1000 s$^{-1}$ and temperature 15° C. above the melting temperature (e.g., 350° C.) using a Dynisco LCR7001 capillary rheometer. The rheometer orifice (die) had a diameter of 1 mm, length of 20 mm, L/D ratio of 20.1, and an entrance angle of 180°. The diameter of the barrel was 9.55 mm+0.005 mm and the length of the rod was 233.4 mm.

Melting Temperature:

The melting temperature ("Tm") may be determined by differential scanning calorimetry ("DSC") as is known in the art. The melting temperature is the differential scanning calorimetry (DSC) peak melt temperature as determined by ISO Test No. 11357-2:2013. Under the DSC procedure, samples were heated and cooled at 20° C. per minute as stated in ISO Standard 10350 using DSC measurements conducted on a TA Q2000 Instrument.

Deflection Temperature Under Load ("DTUL"):

The deflection under load temperature may be determined in accordance with ISO Test No. 75-2:2013 (technically equivalent to ASTM D648-07). More particularly, a test strip sample having a length of 80 mm, thickness of 10 mm, and width of 4 mm may be subjected to an edgewise three-point bending test in which the specified load (maximum outer fibers stress) was 0.45 or 1.8 Megapascals. The specimen may be lowered into a silicone oil bath where the temperature is raised at 2° C. per minute until it deflects 0.25 mm (0.32 mm for ISO Test No. 75-2:2013).

Tensile Modulus, Tensile Stress, and Tensile Elongation:

Tensile properties may be tested according to ISO Test No. 527:2012 (technically equivalent to ASTM D638-14). Modulus and strength measurements may be made on the same test strip sample having a length of 80 mm, thickness of 10 mm, and width of 4 mm. The testing temperature may be 23° C., and the testing speeds may be 1 or 5 mm/min.

Flexural Modulus and Flexural Stress:

Flexural properties may be tested according to ISO Test No. 178:2010 (technically equivalent to ASTM D790-10). This test may be performed on a 64 mm support span. Tests may be run on the center portions of uncut ISO 3167 multi-purpose bars. The testing temperature may be 23° C. and the testing speed may be 2 mm/min.

Unotched and Notched Charpy Impact Strength:

Charpy properties may be tested according to ISO Test No. ISO 179-1:2010) (technically equivalent to ASTM D256-10, Method B). This test may be run using a Type 1 specimen size (length of 80 mm, width of 10 mm, and thickness of 4 mm). When testing the notched impact strength, the notch may be a Type A notch (0.25 mm base radius). Specimens may be cut from the center of a multi-purpose bar using a single tooth milling machine. The testing temperature may be 23° C.

Rockwell Hardness:

Rockwell hardness is a measure of the indentation resistance of a material and may be determined in accordance with ASTM D785-08 (Scale M). Testing is performed by first forcing a steel ball indentor into the surface of a material using a specified minor load. The load is then increased to a specified major load and decreased back to the original minor load. The Rockwell hardness is a measure of the net increase in depth of the indentor, and is calculated by subtracting the penetration divided by the scale division from 130.

Surface/Volume Resistivity.

The surface and volume resistivity values are generally determined in accordance with IEC 60093 (similar to ASTM D257-07). According to this procedure, a standard specimen (e.g., 1 meter cube) is placed between two electrodes. A voltage is applied for sixty (60) seconds and the resistance is measured. The surface resistivity is the quotient of the potential gradient (in V/m) and the current per unit of electrode length (in A/m), and generally represents the resistance to leakage current along the surface of an insulating material. Because the four (4) ends of the electrodes define a square, the lengths in the quotient cancel and surface resistivities are reported in ohms, although it is also common to see the more descriptive unit of ohms per square. Volume resistivity is also determined as the ratio of the potential gradient parallel to the current in a material to the current density. In SI units, volume resistivity is numerically equal to the direct-current resistance between opposite faces of a one-meter cube of the material (ohm-m).

Example 1

Samples 1-6 are formed from various percentages of a liquid crystalline polymer, glass fibers, ultrahigh molecular weight siloxane polymer (Genioplast® Pellet S), talc, mica (Suzorite 200 HK), black color masterbatch, and aluminum trihydrate, as indicated in Table 1 below. The liquid crystalline polymer is formed from HBA, HNA, TA, BP, and APAP, such as described in U.S. Pat. No. 5,508,374 to Lee, et al. The black color masterbatch contains 80 wt. % liquid crystalline polymer and 20 wt. % carbon black. Compounding is performed using an 18-mm single screw extruder. Parts are injection molded the samples into plaques (60 mm×60 mm).

TABLE 1

| Sample | 1 | 2 | 3 | 4 | 5 | 6 |
|---|---|---|---|---|---|---|
| LCP | 62.7 | 63.1 | 52.7 | 52.7 | 52.7 | 52.7 |
| Black Color Masterbatch | 5 | 5 | 5 | 5 | 5 | 5 |
| Glass Fibers | — | — | 10 | 15 | 20 | 20 |
| Genioplast ® Pellet S | 40 | 40 | 40 | 40 | 40 | 40 |
| Alumina Trihydrate | 0.8 | 0.4 | 0.8 | 0.8 | 0.8 | 0.8 |
| Talc | — | — | 30 | 25 | 20 | 20 |
| Mica | 30 | 30 | — | — | — | — |

Samples 1-6 were tested for thermal, mechanical, and wear properties. The results are set forth below in Table 2.

TABLE 2

| Sample | 1 | 2 | 3 | 4 | 5 | 6 |
|---|---|---|---|---|---|---|
| Melt Viscosity at 1,000 s$^{-1}$ (Pa-S) | 6.3 | 7.2 | 11.7 | 15 | 18 | 23.5 |
| DTUL @ 0.45 Mpa (° C.) | 271 | 275 | 272 | — | — | 290 |
| Tensile Strength (MPa) | 82 | 93 | 84 | 92 | 91 | 108 |
| Tensile Modulus (MPa) | 9,807 | 9,066 | 10,360 | 10,865 | 10,328 | 11,359 |
| Tensile Elongation (%) | 1.7 | 2.6 | 2.2 | 2.3 | 2.0 | 1.8 |
| Flexural Strength (MPa) | 125 | 125 | 126 | 129 | 135 | 167 |
| Flexural Modulus (MPa) | 12,400 | 10,622 | 10,580 | 10,728 | 11,231 | 12,176 |
| Thickness Exhibiting V0 Flammability (mm) | 0.8 | 0.4 | 0.4 | 0.4 | 0.4 | — |

Example 2

Samples 7-12 are formed from various percentages of a liquid crystalline polymer, ultrahigh molecular weight siloxane polymer (Genioplast® Pellet S), mica (Thor FPz), barium sulfate, impact modifier (Lotader®8840), black color masterbatch, and antistatic filler, as indicated in Table 3 below. The liquid crystalline polymer (LCP 1) in Samples 7-10 is formed from HBA, HNA, TA, BP, and APAP, such as described in U.S. Pat. No. 5,508,374 to Lee, et al, while the IT, liquid crystalline polymer (LCP 2) in Samples 11-12 is formed from HBA, HNA, and TA. The black color masterbatch contains 80 wt. % liquid crystalline polymer and 20 wt. % carbon black. The antistatic filler is an ionic liquid—i.e., tri-n-butylmethylammonium bis(trifluoromethanesulfonyl)-imide (FC-4400 from 3M). Compounding is performed using an 18-mm single screw extruder. Parts are injection molded the samples into plaques (60 mm×60 mm).

TABLE 3

| Sample | 7 | 8 | 9 | 10 | 11 | 12 |
|---|---|---|---|---|---|---|
| LCP 1 | 41.9 | 42.9 | 43.4 | 42.4 | — | — |
| LCP 2 | — | — | — | — | 41.9 | 42.9 |
| Barium Sulfate | 40 | 40 | 40 | 40 | 40 | 40 |
| Lotader ® 8840 | 1 | 1 | 1 | 1 | 1 | 1 |
| Black Color Masterbatch | 12.5 | 12.5 | 12.5 | 12.5 | 12.5 | 12.5 |
| Mica (Thor FPz) | 2 | 2 | 2 | 2 | 2 | 2 |
| Genioplast ® Pellet S | 2 | 1 | 0.5 | 1.5 | 2 | 1 |
| FC-4400 | 0.6 | 0.6 | 0.6 | 0.6 | 0.6 | 0.6 |

Samples 7-8 and 9-12 were tested for thermal, mechanical, and wear properties. The results are set forth below in Table 4.

TABLE 4

| Sample | 7 | 8 | 9 | 11 | 12 |
|---|---|---|---|---|---|
| DTUL @ 1.8 Mpa (° C.) | 213 | 209 | 210 | 190 | 193 |
| Charpy Notched (kJ/m$^2$) | — | — | — | 8.6 | 9.3 |
| Rockwell Hardness (M-scale) | 41 | 45 | 46 | 48 | 54 |
| Tensile Strength (MPa) | 101 | 101 | 101 | 113 | 116 |
| Tensile Modulus (MPa) | 6,866 | 6,873 | 7,122 | 7,155 | 7,572 |
| Tensile Elongation (%) | 3.98 | 4.13 | 3.43 | 5.30 | 5.03 |
| Flexural Strength (MPa) | 113 | 115 | 118 | 124 | 130 |
| Flexural Modulus (MPa) | 7,331 | 7,309 | 7,588 | 7,660 | 8,045 |
| Dynamic Coefficient of Friction | 0.17 | 0.47 | 0.58 | 0.16 | 0.45 |
| Wear Depth | 2 | 157 | 326 | 2 | 152 |

Example 3

Samples 13-18 are formed from various percentages of a liquid crystalline polymer, ultrahigh molecular weight siloxane polymer (Genioplast® Pellet S), mica, barium sulfate, impact modifier (Lotader®8840), PTFE (KT 300M), and black color masterbatch, as indicated in Table 5 below. The liquid crystalline polymer (LCP 1) in Samples 16-18 is formed from HBA, HNA, TA, BP, and APAP, such as described in U.S. Pat. No. 5,508,374 to Lee, et al, while the liquid crystalline polymer (LCP 2) in Samples 13-15 is formed from HBA, HNA, and TA. The black color masterbatch contains 80 wt. % liquid crystalline polymer and 20 wt. % carbon black. Compounding is performed using an 18-mm single screw extruder. Parts are injection molded the samples into plaques (60 mm×60 mm).

TABLE 5

| Sample | 13 | 14 | 15 | 16 | 17 | 18 |
|---|---|---|---|---|---|---|
| LCP 1 | — | — | — | 36.5 | 40.5 | 50.5 |
| LCP 2 | 36.5 | 40.5 | 50.5 | — | — | — |
| Barium Sulfate | 40 | 40 | — | 40 | 40 | — |
| Lotader ® 8840 | 4 | — | 4 | 4 | — | 4 |
| Black Color Masterbatch | 12.5 | 12.5 | 12.5 | 125 | 12.5 | 12.5 |
| Mica (Suzolite) | — | — | 26 | — | — | 26 |
| Genioplast ® Pellet S | 5 | 5 | 5 | 5 | 5 | 5 |
| PTFE (KT 300M) | 2 | 2 | 2 | 2 | 2 | 2 |

Samples 13-18 were tested for thermal, mechanical, and wear properties. The results are set forth below in Table 6.

TABLE 6

| Sample | 13 | 14 | 15 | 16 | 17 | 18 |
|---|---|---|---|---|---|---|
| MV 1000 (Pa-S) | 116 | 56 | 96 | 68 | 33 | 60 |
| Melting Temperature (° C.) | 329 | 329 | 330 | 328 | 328 | 329 |
| DTUL @ 1.8 Mpa (° C.) | 165 | 185 | 208 | 200 | 217 | 234 |
| Charpy Notched (kJ/m$^2$) | 3.7 | 8.8 | 4.0 | 3.9 | 3.8 | 4.4 |
| Rockwell Hardness (M-scale) | 22 | 41 | 30 | 14 | 34 | 35 |
| Tensile Strength (MPa) | 70 | 103 | 76 | 83 | 93 | 75 |
| Tensile Modulus (MPa) | 5,900 | 7,725 | 9,599 | 5,687 | 7,476 | 9,133 |
| Tensile Elongation (%) | 2.43 | 3.20 | 1.53 | 3.88 | 2.18 | 1.41 |
| Flexural Strength (MPa) | 95 | 122 | 117 | 87 | 115 | 109 |
| Flexural Modulus (MPa) | 5,749 | 7,441 | 9,493 | 5,569 | 7,283 | 9,273 |
| Dynamic Coefficient of Friction | — | 0.16 | — | — | 0.17 | — |
| Wear Depth (μm) | — | 0.2 | — | — | 1 | — |

Example 4

Samples 19-23 are formed from various percentages of a liquid crystalline polymer, glass fibers, ultrahigh molecular weight siloxane polymer (Genioplast® Pellet S), talc, mica (Suzorite 200 HK), black color masterbatch, and aluminum trihydrate, as indicated in Table 7 below. The liquid crystalline polymer is formed from HBA, HNA, TA, and BP. The black color masterbatch contains 80 wt. % liquid crystalline polymer and 20 wt. % carbon black. Compounding is performed using an 18-mm single screw extruder. Parts are injection molded the samples into plaques (60 mm×60 mm).

TABLE 7

| Sample | 19 | 20 | 21 | 22 | 23 |
|---|---|---|---|---|---|
| LCP | 58.6 | 56.8 | 56.8 | 56.8 | 53.8 |
| Black Color Masterbatch | 5 | 5 | 5 | 5 | 5 |
| Glass Fibers | 18 | 25 | 12 | 25 | 20 |
| Genioplast ® Pellet S | — | 1 | 1 | 1 | 1 |
| Alumina Trihydrate | 0.2 | 0.2 | 0.2 | 0.2 | 0.2 |
| Talc | 18 | — | — | 12 | 20 |
| Mica | — | 12 | 25 | — | — |

Samples 19-23 were tested for thermal, mechanical, and wear properties. The results are set forth below in Table 8.

TABLE 8

| Sample | 19 | 20 | 21 | 22 | 23 |
|---|---|---|---|---|---|
| Melt Viscosity at 1,000 s$^{-1}$ (Pa-S) | 16.9 | — | 11.1 | 11.4 | 12.2 |
| DTUL @ 1.8 Mpa (° C.) | 298 | — | 278 | 291 | 282 |
| Tensile Strength (MPa) | 110 | — | 81 | 89 | 85 |
| Tensile Modulus (MPa) | 11,000 | — | 9,544 | 9,327 | 10,062 |
| Tensile Elongation (%) | 2.0 | — | 1.4 | 2.0 | 1.8 |
| Flexural Strength (MPa) | 160 | — | 127 | 132 | 127 |
| Flexural Modulus (MPa) | 11,000 | — | 9,725 | 9,753 | 9,727 |
| Thickness Exhibiting V0 Flammability (mm) | 0.25 | 0.4 | 0.4 | 0.4 | 0.4 |

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A polymer composition comprising at least one thermotropic liquid crystalline polymer and an ultrahigh molecular weight siloxane polymer in an amount from about 0.1 to about 20 parts by weight per 100 parts by weight of the liquid crystalline polymer, wherein the siloxane polymer has a number average molecular weight of about 100,000 grams per mole or more.

2. The polymer composition of claim 1, wherein the siloxane polymer has a kinematic viscosity of about 10,000 centistokes or more.

3. The polymer composition of claim 1, wherein the liquid crystalline polymer constitutes from about 20 wt. % to about 80 wt. % of the polymer composition and the siloxane polymer constitutes from about 0.1 wt. % to about 8 wt. % of the polymer composition.

4. The polymer composition of claim 1, wherein the siloxane polymer includes siloxane units in the backbone having the formula:

$$R_r SiO_{(4-r/2)}$$

wherein R is independently hydrogen or substituted or unsubstituted hydrocarbon radicals and r is 0, 1, 2 or 3.

5. The polymer composition of claim 4, wherein the siloxane polymer includes alkyl radicals bonded to at least 70 mol % of the Si atoms.

6. The polymer composition of claim 1, wherein the siloxane polymer includes dimethylpolysiloxane, phenylmethylpolysiloxane, vinylmethylpolysiloxane, trifluoropropylpolysiloxane, or a combination thereof.

7. The polymer composition of claim 1, wherein the polymer composition further includes silica particles.

8. The polymer composition of claim 1, wherein the polymer composition contains a particulate filler.

9. The polymer composition of claim 8, wherein the particulate filler is present in an amount of from about 10 to about 95 parts weight per 100 parts of the liquid crystalline polymer.

10. The polymer composition of claim 8, wherein the particulate filler has a hardness value of about 2 or more based on the Mohs hardness scale.

11. The polymer composition of claim 8, wherein the particulate filler includes flaked-shaped particles having an aspect ratio of about 3:1 or more and an average diameter of from about 5 micrometers to about 200 micrometers.

12. The polymer composition of claim 11, wherein the flake-shaped particles include mica.

13. The polymer composition of claim 8, wherein the particulate filler includes granular particles having an average diameter of from about 0.1 to about 10 micrometers.

14. The polymer composition of claim 13, wherein the granular particles include barium sulfate.

15. The polymer composition of claim 8, wherein the particulate filler includes a fluorinated additive.

16. The polymer composition of claim 1, further comprising reinforcing fibers.

17. The polymer composition of claim 16, wherein the reinforcing fibers include glass fibers.

18. The polymer composition of claim 1, further comprising an impact modifier.

19. The polymer composition of claim 18, wherein the impact modifier includes an epoxy-functionalized olefin copolymer.

20. The polymer composition of claim 1, further comprising an antistatic filler.

21. The polymer composition of claim 20, wherein the antistatic filler includes an ionic liquid.

22. The polymer composition of claim 1, wherein the polymer composition has a melt viscosity of from about 2 to about 60 Pa-s as determined in accordance with ISO Test No. 11443:2005 at a shear rate of 1000 seconds$^{-1}$ and temperature that is 15° C. higher than the melting temperature of the composition.

23. The polymer composition of claim 1, wherein the liquid crystalline polymer contains repeating units derived from terephthalic acid, isophthalic acid, 2,6-naphthalenedicarboxylic acid, 4-hydroxybenzoic acid, 6-hydroxy-2-naphthoic acid, hydroquinone, 4,4'-biphenol, acetaminophen, or a combination thereof.

24. The polymer composition of claim 1, wherein the composition exhibits a V0 rating at a thickness of 0.4 mm as determined in accordance with UL94.

25. The polymer composition of claim 1, wherein the composition exhibits a V0 rating at a thickness of 0.8 mm as determined in accordance with UL94.

26. The polymer composition of claim 1, wherein the composition exhibits a dynamic coefficient of friction of about 1.0 or less as determined in accordance with VDA 230-206:2007.

27. The polymer composition of claim 1, wherein the composition exhibits a wear depth of about 500 micrometers or less as determined in accordance with VDA 230-206:2007.

28. A molded part comprising the polymer composition of claim 1.

29. An electrical connector comprising the molded part of claim 28.

30. A camera module comprising the molded part of claim 28.

* * * * *